Patented June 17, 1930

1,765,307

UNITED STATES PATENT OFFICE

HENRY HOWARD, OF CLEVELAND, OHIO, ASSIGNOR, BY MESNE ASSIGNMENTS, TO THE GRASSELLI CHEMICAL COMPANY, OF CLEVELAND, OHIO, A CORPORATION OF DELAWARE

METHOD OF PREPARING COLLOIDAL SULPHUR

No Drawing.   Application filed November 17, 1926.   Serial No. 148,999.

The present invention relates to a process for preparing colloidal sulphur from aqueous solutions of sulphur dioxide (sulphurous acid) and suitable compounds of calcium and sulphur.

Heretofore, colloidal sulphur has been prepared by simultaneously passing hydrogen sulfid and sulphur dioxide into water, these compounds then reacting according to the following equation:

$$2H_2S + SO_2 = 3S + 2H_2O.$$

The commercial preparation of colloidal sulphur from hydrogen sulfid and sulphur dioxide in accordance with the above equation is not satisfactory, however, due to the excessive cost of the necessary hydrogen sulfid, and the difficulties arising from handling large quantities of this obnoxious gas. It has also been proposed to manufacture colloidal sulphur by acidulating lime sulphur solutions, but experimental data obtained on such processes indicates that while a finely divided sulphur may be thus obtained, it is not of the degree of fineness required for the true colloidal state.

The principal object of this invention is the provision of a process for preparing elemental sulphur which is in the true colloidal state, from compounds of calcium and sulphur, such as calcium sulfid and lime sulphur, and sulphur dioxide. A further object of the invention is the provision of a process for preparing colloidal sulphur in which no evolution and escape of free hydrogen sulfid gas is likely to occur, and the resulting atmospheric pollution and loss of sulphur are obviated.

My invention is based upon the discovery that colloidal sulphur can be prepared by reacting a suitable compound of calcium and sulphur with sulphur dioxide in aqueous solution, and that the reaction can be carried out without any substantial loss of available sulphur due to the escape of hydrogen sulfid gas from the reaction mixture, provided an excess of sulphur dioxide is maintained throughout the reaction.

The compound of calcium and sulphur may be provided either as ordinary calcium sulfid (CaS), or as lime sulphur. Calcium sulfid suitable for use in my process may be prepared by roasting gypsum under reducing conditions, although calcium sulfid made in any other way may, of course, be used. The lime sulphur may be prepared in the usual way by heating a mixture of milk of lime (a slurry of calcium hydroxide in water) and sulphur. The exact composition of the resulting lime-sulphur compound is not known with certainty, but it probably comprises a mixture of the persulfids $CaS_4$ and $CaS_5$.

In case calcium sulfid is used it is preferably added to the aqueous solution of sulphur dioxide in a finely divided solid condition and at a slow rate, the essential condition being the maintenance of an excess of sulphur dioxide in the reaction mixture until the end point of the reaction is reached. The procedure may be carried out, for example, by a batch process in which the sulfid of calcium is run into an aqueous solution of sulphur dioxide which contains the total amount of sulphur dioxide needed to complete the reaction, or by a continuous process in which both the sulphur dioxide and sulfid of calcium are added either continuously or intermittently to the reaction mixture at such relative rates that an excess of sulphur dioxide is always present. The course of the reaction is probably represented by the following equations:

(1) $CaS + H_2SO_3 = CaSO_3 + H_2S$
(2) $2H_2S + SO_2 = 3S$ (colloidal) $+ 2H_2O$
(3) $CaSO_3 + S_2 = CaS_2O_3 + S$ (colloidal)

The resulting colloidal solution or suspension of sulphur is stable and may be filtered or allowed to stand for a considerable period of time without separation of the sulphur. The calcium thiosulfate ($CaS_2O_3$) formed in this process is not separated from the colloidal sulphur produced as it is entirely inert in most of the uses to which the colloidal sulphur is applied, for example as a fungicide.

When lime sulphur is used instead of the calcium sulfid, the procedure is substantially the same, the lime sulphur being added in the form of an aqueous solution to the sulphur dioxide solution in controlled amounts so that an excess of sulphur dioxide in the reaction mixture is maintained, and the final products are the same. A larger proportion of the available sulphur is, however, converted into colloidal sulphur and therefore if the colloidal sulphur is the principal product desired, the use of lime sulphur is more advantageous. The yield of colloidal sulphur is increased by increasing the degree of saturation of the lime sulphur solution with sulphur, and for this reason the lime sulphur solution should preferably contain the maximum amount of sulphur.

The maintenance of an excess of sulphur dioxide in the reaction mixture is an essential feature of my process. It has been found that this condition results in an entirely different set of reactions than those which occur when sulphur dioxide is added to a reaction mixture containing an excess of lime sulphur or calcium sulfid. By adding the lime sulphur or calcium sulfid to an aqueous solution of sulphur dioxide in which the latter is present in excess, decomposition of the sulfid of calcium results and any hydrogen sulfid thereby formed reacts with the sulphur dioxide or sulphurous acid present to form colloidal sulphur. If the admixture of the sulphur dioxide and the sulfid of calcium is effected by the reverse of this procedure, i. e., by treating sulfid of calcium with sulphur dioxide, the former being in excess, any hydrogen sulfid formed reacts with the sulfid of calcium to form calcium hydrosulfid ($Ca(HS)_2$). After all the sulfid of calcium has been converted into calcium hydrosulfid any further addition of sulphur dioxide will cause the calcium hydrosulfid to decompose, liberating hydrogen sulfid which will escape from the reaction mixture into the atmosphere and be lost.

If desired the stability of the colloidal sulphur solution may be increased by adding a protective colloid to the aqueous solution of sulphur dioxide. Various colloids are suitable for this purpose, such as the waste liquor from the sulphite pulp process. The protective colloid used must of course be one which is not decomposed by sulphurous acid. Protective colloids such as rosin soap are not suitable for that reason.

I claim:

1. A process for preparing colloidal sulphur, which comprises reacting a sulfid of calcium with sulphur dioxide in aqueous solution, the sulphur dioxide being maintained in excess throughout the reaction.

2. A process for preparing colloidal sulphur, which comprises reacting lime sulphur with sulphur dioxide in aqueous solution, the sulphur dioxide being maintained in excess throughout the reaction.

3. A process for preparing colloidal sulphur, which comprises reacting lime sulphur with sulphur dioxide in a saturated aqueous solution, the sulphur dioxide being maintained in excess throughout the reaction.

4. A process for preparing colloidal sulphur, which comprises reacting a sulfid of calcium with sulphur dioxide in aqueous solution and in the presence of a protective colloid, the sulphur dioxide being maintained in excess throughout the reaction.

5. A process for preparing colloidal sulphur, which comprises reacting a sulfid of calcium with sulphur dioxide in aqueous solution, and in the presence of the active constituents of sulfite cellulose waste liquor, the sulphur dioxide being maintained in excess throughout the reaction.

6. A process for preparing colloidal sulphur, which comprises reacting lime sulphur containing the maximum amount of sulphur with sulphur dioxide in aqueous solution, the sulphur dioxide being maintained in excess throughout the reaction.

In testimony whereof, I affix my signature.

HENRY HOWARD.